Nov. 12, 1957  E. R. SCHAEFER ET AL  2,812,769
TENTS
Filed May 6, 1955  8 Sheets-Sheet 2
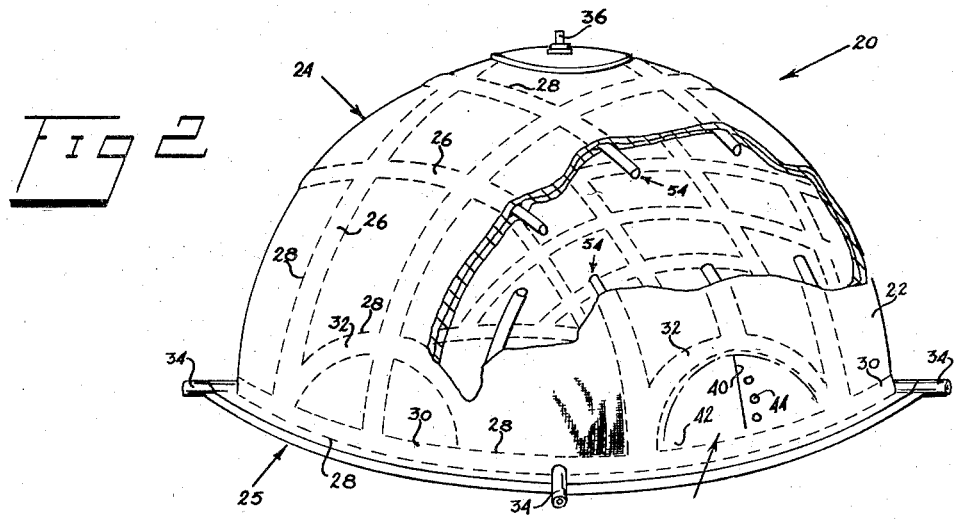
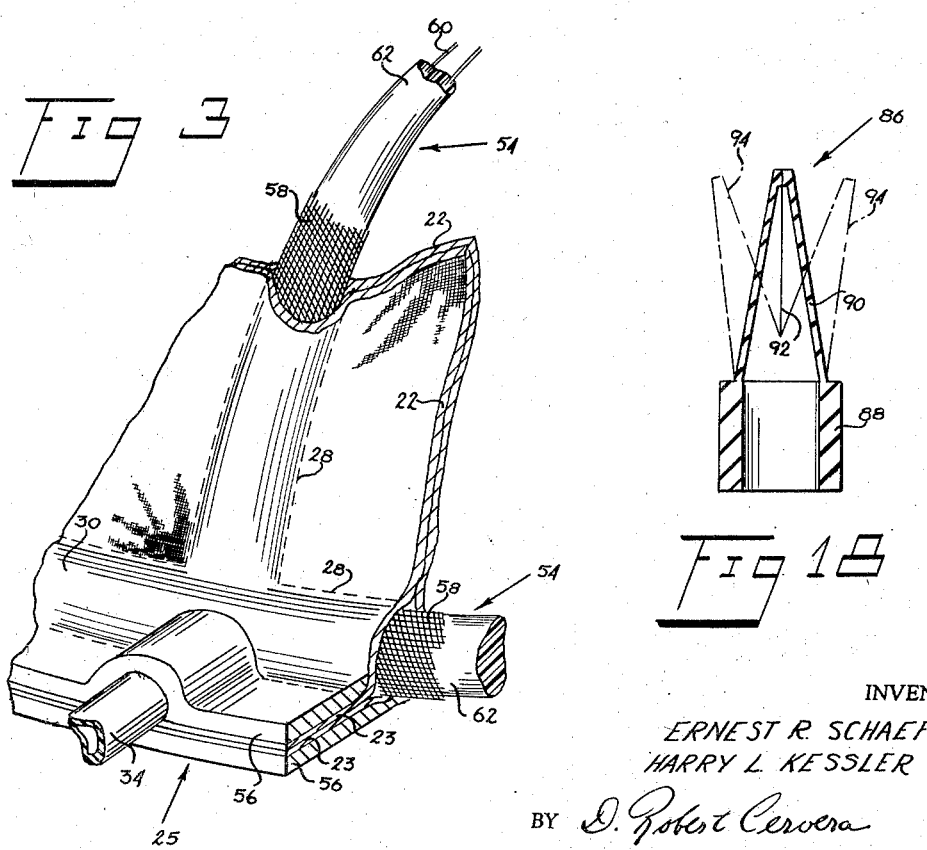
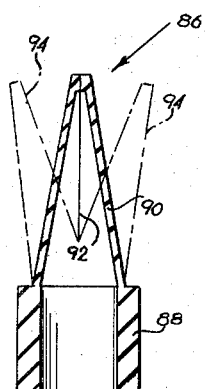
INVENTORS
ERNEST R. SCHAEFER
HARRY L. KESSLER
BY D. Robert Cervera
ATTORNEY Nov. 12, 1957 E. R. SCHAEFER ET AL 2,812,769
TENTS
Filed May 6, 1955 8 Sheets-Sheet 3
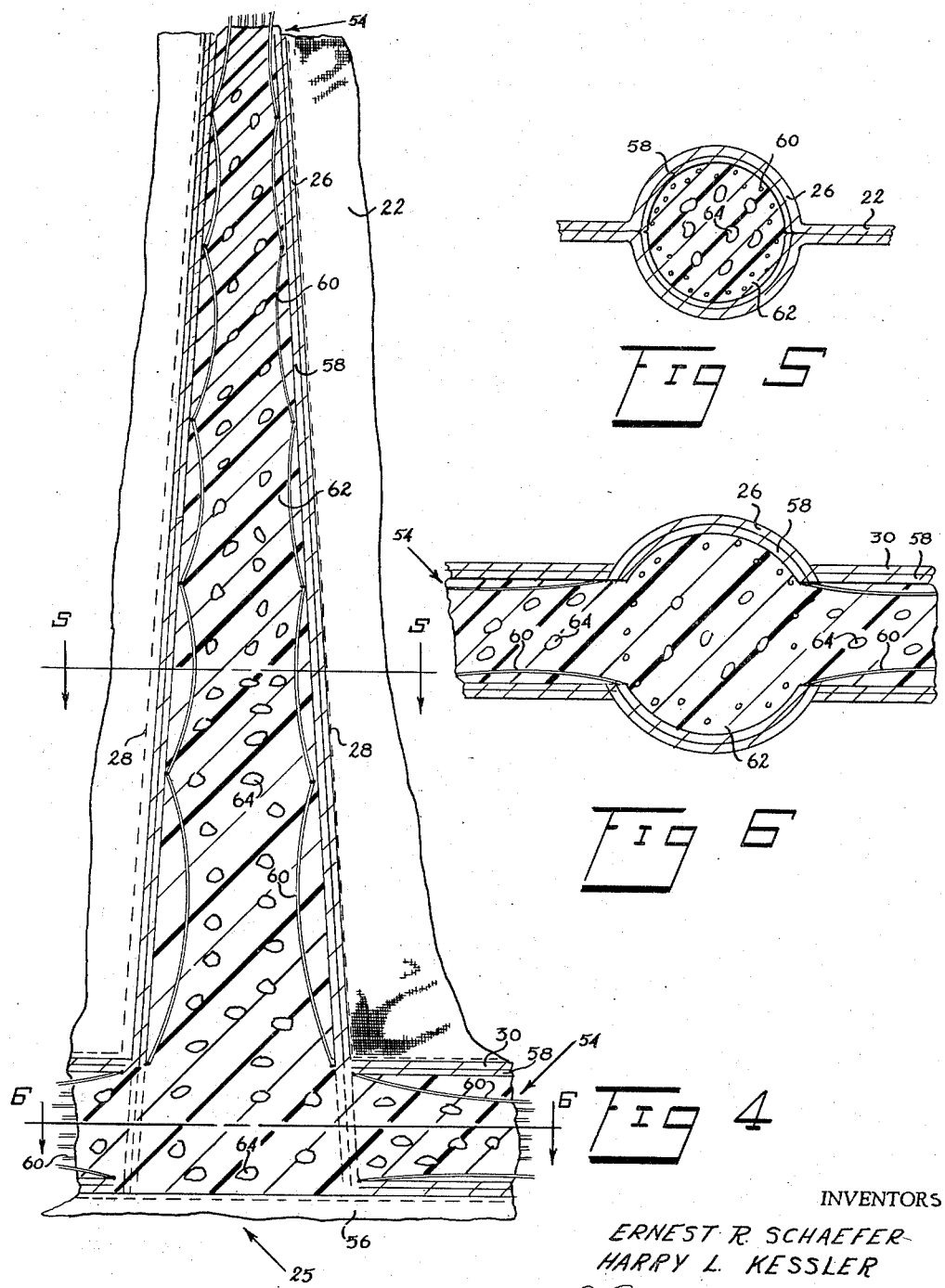
INVENTORS
ERNEST R. SCHAEFER
HARRY L. KESSLER
BY
ATTORNEY Nov. 12, 1957 E. R. SCHAEFER ET AL 2,812,769
TENTS
Filed May 6, 1955 8 Sheets-Sheet 4
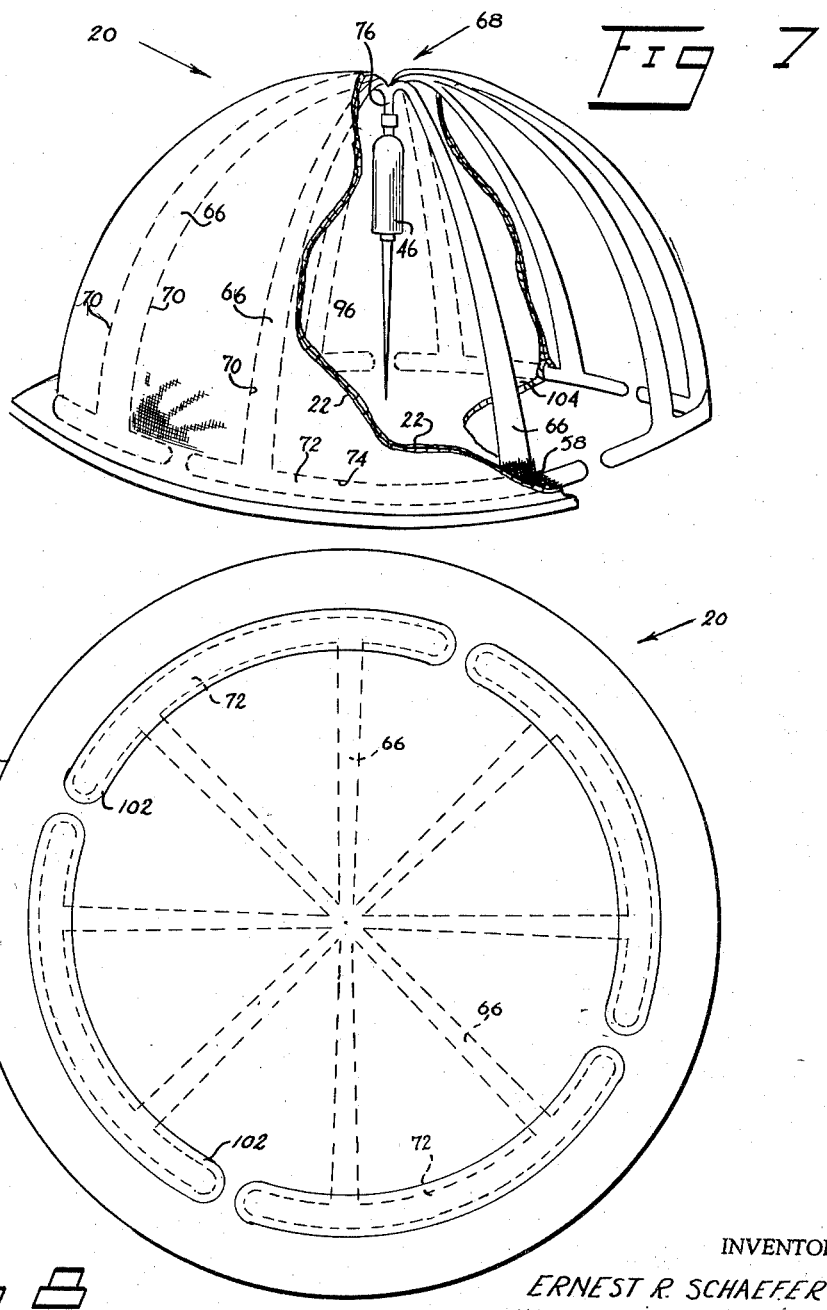
INVENTORS
ERNEST R. SCHAEFER
HARRY L. KESSLER
BY
ATTORNEY Nov. 12, 1957 E. R. SCHAEFER ET AL 2,812,769
TENTS Filed May 6, 1955 8 Sheets-Sheet 5

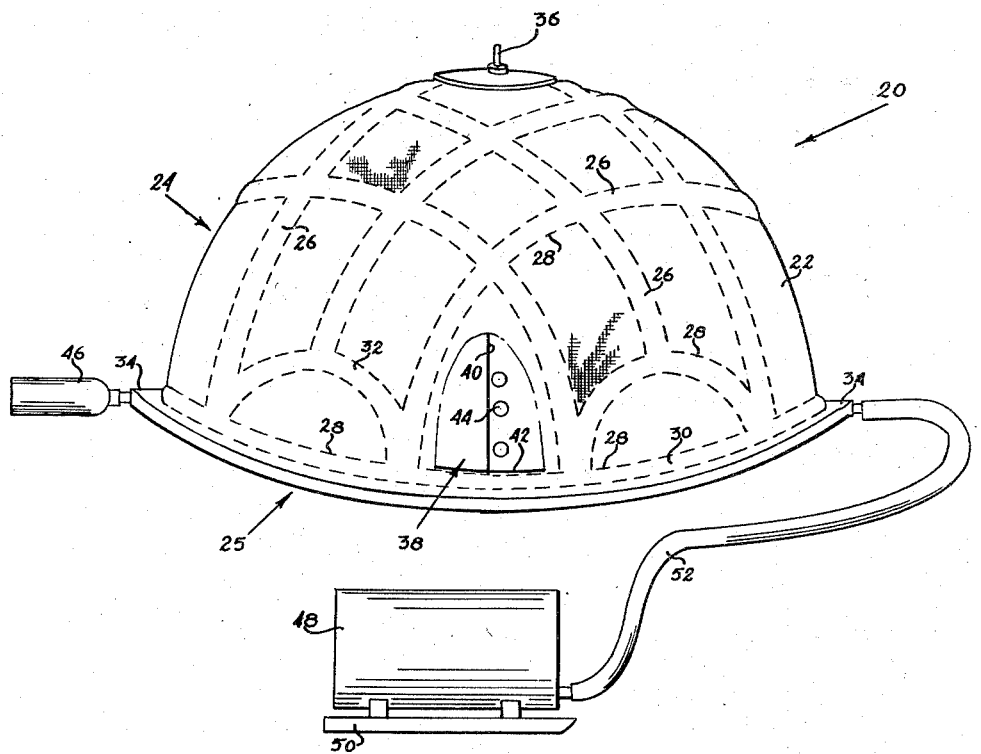

INVENTORS
ERNEST R. SCHAEFER
HARRY L. KESSLER
BY D. Robert Cervera
ATTORNEY

Nov. 12, 1957 E. R. SCHAEFER ET AL 2,812,769
TENTS
Filed May 6, 1955 8 Sheets-Sheet 6

INVENTORS
ERNEST R SCHAEFER
HARRY L. KESSLER
BY
ATTORNEY

Nov. 12, 1957 — E. R. SCHAEFER ET AL — 2,812,769
TENTS
Filed May 6, 1955 — 8 Sheets-Sheet 8

INVENTORS
ERNEST R. SCHAEFER
HARRY L. KESSLER
BY
ATTORNEY

United States Patent Office 2,812,769
Patented Nov. 12, 1957

2,812,769

TENTS

Ernest R. Schaefer, Silver Spring, Md., and Harry L. Kessler, Washington, D. C., assignors to Engineering Development Corporation, Washington, D. C., a corporation of Maryland Application May 6, 1955, Serial No. 506,477

9 Claims. (Cl. 135—1)

This invention relates to shelters and more particularly lightweight portable tent-like shelters.

The well known conventional canvas tent has long been and continues to be the basic shelter for the military both during training maneuvers and during actual combat conditions, and has found wide applications as personnel shelters of varying sizes, fieldhospitals, command posts, equipment shelters, and the like. With the advent of the highly flexible and mobile paratroop and ranger type of operation and the concurrent development of equipment air drops, the tent, by virtue of its ability to be compactly packaged, has gained greater importance as a basic piece of equipment in military operations.

However, despite the many advantages afforded by the tent type of shelter there are still several disadvantages to the use of the conventional canvas tent with its many poles or ribs defining its structural frame. Most notable of the disadvantages of the conventional tent concerns the logistic phase of military operation. Each tent requires its own set of tent poles, pegs and guy ropes, thereby requiring a large inventory of these components specially stored with the particular size tent for which they are intended. The conventional form of tent becomes virtually useless in the field if such a tent is shipped without its own particular supporting structure, since as is usually the case in the field the troops have neither the time to cut trees adequate for improvising a tent structure, or else the particular terrain of the operation, such as the Arctic climates, do not afford readily available natural material from which a tent supporting structure could be improvised.

The foregoing described disadvantages of the conventional canvas tent supported by a conventional pole type of structure have long been recognized in the art, and many efforts have been made to provide tent structures that are not wholly dependent for their usefulness on a separate tent structure. Representative of these prior art efforts are United States Letters Patents 1,964,818 issued to R. A. Hood; 2,649,101 issued to C. G. Suits; and 2,698,020 issued to W. J. Phane. Each of the above mentioned patents are structures formed from plastic material having substantially airtight air chambers therein which are inflatable to extend and maintain the material into a shelter. In the case of the shelter disclosed in United States Letters Patent 2,649,101 the air chamber in addition to being inflated is also filled with an insulating material such as rock wool or the like which is compacted by means of an evacuating pump which imparts further rigidity to the shelter.

The inflatable type of tent though lessening the number of elements involved in its construction over the aforedescribed conventional type of tent still has inherent disadvantages which are the reasons that this form of shelter has not been completely acceptable, especially for military operations. The prime disadvantages of the inflatable type of tent is the lack of rigidity of this type of shelter, as well as its ability to lose air and ultimately collapse. The Suits patent recognized these inherent disadvantages and has attempted to solve them by filling the air chambers with a compactible material to impart a greater degree of rigidity to the shelter as well as to maintain its essential form despite possible leakages of the air chambers.

The present novel invention represents considerable improvement in construction and function over the above-described and similar patents by providing a novel tent-type shelter inflatable to its desired shape and having novel means for providing a rigid supporting structure therefor. The novel tent of the present invention is capable of being as compactly packaged as heretofore known tent structures, requires no complex supporting structure as in the conventional type of tent structures, and does not require any elaborate type of pumping mechanism to maintain the structure in its inflated or extended position.

The tent of the present invention is formed from a pliable material having a plurality of air chambers therein inflatable to extend the material to shelter defining position. The several chambers are filled with a flowable composition in a plastic state which hardens after a brief period of time to define a rigid supporting structure in said chambers and inherent in said shelter to form an efficient support therefor.

It is therefore a primary object of the present invention to provide novel tent shelters.

Another object of the present invention is to provide a tent-type shelter having novel supporting structural means.

A further object of the present invention is to provide an inflatable tent-type shelter with novel rigid structural means.

An additional object of the present invention is to provide a tent-like shelter former with a plurality of air chambers with means for inflating said air chambers and distending said tent, and then filling said chambers with a flowable composition in a plastic state which hardens in said chambers to define rigid structural ribs for supporting said tent structure.

Still another object of the present invention is to provide a novel structural frame member formed from pliable foldable material having a plurality of air chambers inflatable to distend said frame member and then filled with a flowable composition in a plastic state which hardens in said air chambers to impart structural rigidity to said frame members.

Another object of the present invention is to provide a tent formed from a pliable foldable material having a plurality of interconnecting air chambers inherent therein, inflatable to distend said tent and filled under pressure with a flowable plastic composition in a plastic state which hardens therein to impart structural rigidity to said tent and maintain it in its distended position.

A further object of the present invention is to provide a tent formed from a pliable foldable material having a plurality of interconnecting air chambers all joined at a common point, pressure means for inflating said chambers and distending said tent, and pressure means for filing said chambers with a flowable plastic composition which fills said chambers and hardens therein to form a rigid structural supporting frame for said tent.

Another object of the present invention is to provide a tent-like shelter of foldable material having a plurality of interconnecting air chambers therein, lining means in said air chambers to aid in imparting structural rigidity thereto, a plurality of fibers extending throughout said chambers in spaced relation to the walls thereof, means for inflating said chambers to distend said tent, and means for filling said chambers with a flowable composition which hardens in said chambers to define a rigid structural frame for said tent maintaining it in its distended position.

Still an additional object of the present invention is to provide a tent-like shelter of pliable foldable material having a plurality of interconnecting inflatable air chambers and valve means connected to said air chambers, pressure means for inflating said air chambers and distended said tent; and other pressure means containing a flowable composition for delivering the composition to said air chambers where it expands and fills said chambers and hardens therein to form a rigid structural support for said tent.

Yet a further object of the present invention is to provide a tent-like shelter of pliable foldable material having a plurality of interconnecting inflatable air chambers partially filled with small particles, valve means connected to said air chambers, a pressure bottle for delivering air to said chambers to distend said tent, and another pressure bottle containing a flowable composition in a plastic state for delivering said composition through said valve means to said chambers where the composition expands, filling said chambers, and hardens therein to form a rigid inherent structural frame for said tent.

Another object is to provide an inexpensive, readily assembled tent-like shelter having its own inherent rigid structural supporting frame.

These and other objects will appear from the following detailed description and appended claims when read in conjunction with the attached drawings, wherein:

Figure 1 is a front elevational view of a preferred embodiment of the present invention showing different means for inflating and filling the novel tent;

Figure 2 is a front elevational view partially broken away showing the novel disposition of chambers and the rigid ribs therein;

Figure 3 is a fragmentary perspective view of one rib or chamber of the novel tent showing the disposition of the liner, hardened plastic, and strengthening strands therein;

Figure 4 is a fragmentary vertical sectional view of one of the ribs or chambers of the novel tent showing the details thereof;

Figure 5 is a horizontal sectional view taken substantially along the line 5—5 of Figure 4;

Figure 6 is a horizontal sectional view taken substantially along the line 6—6 of Figure 4;

Figure 7 is a perspective view partially broken away of a further embodiment of the present invention;

Figure 8 is a bottom plan view of the embodiment shown in Figure 7;

Figure 10:
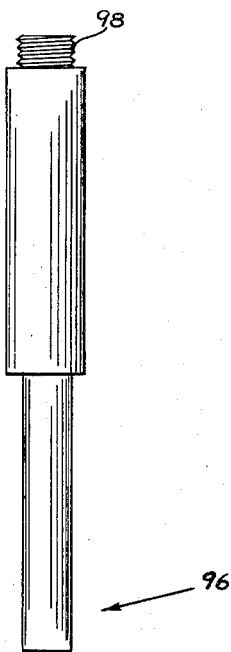
Figure 10 is a front elevational view of a telescoping stand mountable on the lower end of the pressure bottles to support them when connected to said tents.

The invention herein disclosed is directed to novel structures having novel means for forming a rigid structural frame therefor at the site of use and as herein disclosed is particularly directed to shelters; such as, tents but is equally applicable to other forms of structures; as for example, inflatable life rafts, small boats, life jackets, and the like.

Turning now to Figure 1 a detailed description of a preferred embodiment of the novel inflatable tent-like structure, generally designated 20, will now be particularly described. As illustrated in Figure 1 the shelter 20 is of parabolic or igloo form, however, it will be readily appreciated as this description proceeds that the novel invention herein disclosed is equally applicable to other forms of shelters; such as pup or quonset forms of tents.

Shelter 20 is formed from a double layer of pliable foldable material 22; such as, canvas, nylon, or other suitable types of fabrics, and comprises a main dome structure, generally indicated 24, and a floor structure designated generally by 25. Dome structure 24 is provided with a plurality of large interconnected substantially hemispherical ribs 26, formed in the double layers of material 22 as by spaced stitchings 28, connected at their lower ends to a circumferential rib 30 adjacent floor 25, also formed by spaced stitchings 28. Also interconnected to ribs 26 and 30 are plurality of small essentially semi-circular ribs 32 also formed by stitchings 28 adjacent the lower end of shelter 20. As a result of forming the various ribs in the above described manner there are a plurality of interconnecting inflatable air chambers defined by the ribs 26, 30, and 32 for a purpose to be described more fully hereinafter.

A plurality of valve housings 34 are provided at the lower portion of shelter 20 which open into the interior of lower circumferential rib 30, for a purpose to be described, while another valve housing 36 is provided at the top or peak of shelter 20 which connects or opens into a common connection of some of the ribs 26. Valves 34 and 36 permit the inflation of shelter 20 and also the admission of a readily hardenable substance into the ribs to form a rigid structural support for shelter 20, as will hereinafter appear.

A door or passageway, generally designated 38 and defined by cuts or slits 40 and 42 in material 22 is provided at the lower portion of shelter 20 for ready access or exit from the shelter. Door 38 is closed or secured by means of snap fasteners 44, or by means of a zipper or lacings if so desired.

Shelter 20 is inflatable to its desired distended form by filling the various ribs of shelter 20 by means of air pressure. Once the shelter 20 is so inflated the ribs 26, 30, and 32 are filled with a composition that is in a flowable or plastic condition originally, but which readily and quickly hardens once it is admitted to the ribs of shelter 20. The hardenable composition can be any of the well known plastic substances, and can be of the well known foaming or cellular type or of the non-foaming types of plastic. The basic purpose of the hardenable plastic is to form within the various ribs 26, 30, and 32 a continuous rigid structural frame structure; the use of the foaming or cellular types of plastics assure an adequate volume of the material to properly fill all the spaces within the ribs. However, provision has herein been made to employ the well known hardenable non-foaming plastic and yet assure a complete filling of the rib spaces to define a complete rigid frame structure.

Shelter 20 is inflated in the field by means of attaching pressure bottles to one or several of the valve housings 34 and 36; the pressure being released from the bottle 46 to thereby inflate the tent or shelter 20. Once shelter 20 is so inflated other pressure bottles similar to bottles 46 can be attached to one or several of the valve housings 34 and 36. These latter pressure bottles contain a composition in a flowable plastic state under very high pressure which will readily flow from the bottles 46 when the control valve thereon is opened, and which will quickly harden after being released from the pressure bottles. The composition is released from the pressure bottles 46 and readily flows into the various ribs 26, 30, and 32, as will hereinafter readily appear, filling the ribs much the same as filling a mold. The composition ultimately hardens within the various ribs defining a rigid structural frame. In the case of the cellular types of compositions the composition will foam or expand once it is released from the pressure bottles 46, by virtue of a volatile solvent contained within the composition. However, as heretofore stated the composition need not be of the cellular type but can be of the solid type of hardenable compositions.

Representative of the cellular types of compositions are the resinous benzene-soluble polymers and copolymers of monovinyl aromatic compounds having the vinyl group attached directly to a carbon atom of the aromatic nucleus, particularly styrene. The volatile agents for forming the cellular product may be methyl chloride, methyl ether, ethyl ether, methy ethyl ether, and gaseous olefines; such as ethylene, propylene, or the like. However, as heretofore stated the present novel invention is not dependent on any particular composition or particularly on the cellular types of plastic, but can employ any composition that can be stored in a flowable or plastic condition under high pressure in a pressure bottle, and which will upon release from the pressure bottle easily harden into a rigid stable material to form the structural ribs of the novel shelter 20 herein disclosed.

Some of the small pressure bottles 46 which contain air and others which contain the plastic composition can be directly attached to the valve housings 34 and 36 and the material 22 forming the shelter 20 can be folded thereabout into a compact package which can be used at any time merely by opening the valves on the bottles 46 to inflate the shelter and release the composition thereinto. In the case of large installations, such as training areas or non-combatant areas, a large tank or tanks 48 mounted on skids 50, or on a small truck, and having a hose 52 connected to tank 48 can be employed for successive connection to the valve housings 34 and 36 of a plurality of shelters 20. However, under combat conditions the pressure bottles 46 are more desirable since they can be compactly packaged for air drop type of operations.

Turning now to Figures 2 and 3 the details of construction of the double layers of material 22 and the construction of the various novel ribs will now be particularly described.

As clearly seen in Figure 2 the double layers of material 22 are stitched together by means of stitching 28 and in so connecting the layers together form the various interconnecting ribs 26, 30, and 32 in which the rigid structural members, generally designated 54 are formed. Turning now to Figure 3 the details of construction of the various ribs will now be particularly described. As heretofore described the stitching 28 defines the various inflatable ribs 26, 30, and 32. As seen in Figure 3 the lower ends of material 22 are brought together in contacting relation as designated at 23 and mounted between the double layers 56 of floor 25 and fixedly secured therebetween by lower circumferential stitching 28. In addition layers 23 and 56 can also be cemented together to additionally assure a tight or secure bond therebetween. A plurality of valve housings 34 are disposed between layers 56 of floor 25 and fixedly secured therein as by means of vulcanizing, cementing, or the like to form an airtight assembly. The inside of ribs 26, 30, and 32 are lined with a tubular fabric 58 preferably formed from fiber glass or like materials. A plurality of substantially loose fibers 60 are secured to the inner walls of tubular fabric 58 and extend loosely within fabric 58. As more clearly seen in Figure 4, fibers 60 are formed in successive rows of loose loops; thus when the hardenable composition designated 62 is passed into ribs 26, 30, and 32 it hardens within fabric 58 and in surrounding relation to the loose loops formed by fibers 60 to form an essentially rigid structure. The fabric 58 and fibers 60 serve to impart greater structural strength and rigidity to the ribs 26, 30, and 32 and consequently to shelter 20.

Turning now to Figures 4 through 6 further details of the novel construction of ribs 26, 30, and 32 and the method of filling these ribs with structural material 62 will now be described.

As clearly seen in Figure 4 the stitchings 28 securing layers 22 together define the ribs in which is mounted the tubular fabric 58 to define a hollow chamber or rib therein. Secured to the inner walls of fabric 58 are the plurality of rows of loose loops formed by fibers 60. It can be clearly seen in Figure 4 how the plastic composition 62 forms into a hardened mass in surrounding relation to fibers 60 within fabric 58. As also seen in Figure 4 there are a plurality of small granules or pellets designated 64. Granules 64 are a well known vermiculite insulating material which is readily available commercially under the name of Zonolite. In the formation of the ribs 26, 30, and 32 these ribs are partially filled with these lightweight small cellular vermiculite insulating particles or granules 64. When the ribs are inflated by air pressure these granules 64 are blown about and dispersed throughout the ribs, and the pressure from the pressure bottles containing the composition also maintains the granules 64 in blown dispersed relation throughout the various ribs. The hardenable composition flows into the ribs and surrounds the loops formed by fibers 60 and granules 64. Granules 64 assure the complete filling of the ribs by effectively forming cellular areas through the hardenable composition 62, thus acting as a volume expander. In addition when employing the non-cellular types of compositions the granules 64 in addition to acting as a volume increaser also lighten the solid composition without any appreciable consequent loss in strength of the ribs formed thereby.

Turning now to Figures 7 and 8 a further embodiment of the present novel invention is disclosed and will now be particularly described. In this form of the invention the structural frame is novelly segmentally formed and is capable of being removed from the material 22 of shelter 20 whereby the material 22 can be easily retrieved in the field for subsequent reuse.

Figure 9:
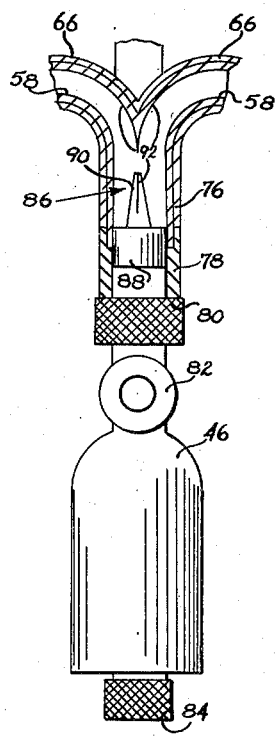
Figure 9 is a partial vertical sectional view showing the method of delivering the structural plastic to the various ribs from a pressure bottle.

As seen in Figure 7 shelter 20 is of generally dome-shape having a plurality of ribs 66 radiating, from a common juncture 68 at the top, downwardly and outwardly. Ribs 66 are defined by spaced stitchings 70 securing double layers 22 together in the same manner as heretofore described. The lower ends of pairs of ribs 66 are connected to arcuate ribs 72 defined by stitchings 74. Extending inwardly and downwardly from the upper end common connection 68 of ribs 66 is a tubular portion 76 the purposes of which will now be described. The lower end of tubular portion 76 is provided with an externally threaded hollow connector 78, as seen in Figure 9, which threadedly engages internally threaded knurled nut 80 non-removably mounted on the upper end of pressure bottle 46.

Bottle 46 is provided at its upper end with a selectively actuated control valve 82 of suitable construction, and is provided at its lower end with an internally threaded knurled connector 84 non-removably mounted on bottle 46.

Fixedly mounted within tubular portion 76, as well as within valve housings 34 and 36, are flexible valves generally designated 86 the details of which are more clearly shown in Figure 18. Valve 86 comprises a substantially rigid hollow body portion 88 from the upper end of which extends integral hollow flexible conical valve portion 90. Conical valve portion 90 is partially slit as at 92 and is mounted within portion 76 and housings 34 and 36 with the cone 90 pointed into or extending into the interior of the housings 34 and 36 and portion 76. The body 88 of valve 86 being fixedly secured therein in airtight relation as by means of vulcanizing, cementing or the like. As a result pressure applied from the exterior of shelter 20 through body 88 forces conical valve 90 apart on line 92 as indicated by phantom lines 94, while back pressure within the various ribs close conical valve 90 preventing the escape of either air or composition therein. Thus there is herein provided a simple, inexpensive, easily replaceable valve.

In order to prevent the weight of pressure bottle 46 secured to portion 76 from collapsing the shelter 20 while it is being inflated and filled with the structural composition a telescoping stand or pole 96 of conventional construction is provided. Pole 96 is provided with a threaded end 98 for connection to connector 84 and at its lower end with a sharp point 100 for driving the pole 96 securely into the ground. Thus stand 96 acts as a perfect simple support for a pressure bottle secured to portion 76 as clearly seen in Figures 7, 10, 11, and 13.

In the form of the invention shown in Figures 7 and 8 the fabric 58 lining ribs 66 and 72 is not secured to the inner walls of the ribs, as described in connection with the embodiments shown in Figures 1 through 6; this is done to permit withdrawal of the hardened composition within ribs 66 and 72 when it is desired to disassemble the shelter and retrieve the outer covering material 22. Turning now particularly to Figure 8 there is shown the details of construction of the underside of the shelter 20 shown in Figure 7. Arcuate strips 102 overlying or coincident with the underside of ribs 72 are stitched or cemented to the floor 104 of shelter 20. When it is desired to remove the hardened composition from ribs 66 and 72 the strips 102 are torn off floor 104 exposing the fabric 58 surrounding the hardened composition in ribs 72. A high pressure bottle of air similar to bottles 46 is secured to portion 76 and the air pressure is released. This release of air pressure forcibly moves the hardened composition in pairs of ribs 66 and their arcuate ribs 72 through the opening in floor 104 exposed by the tearing of strips 102. Once the hardened composition in ribs 66 and 72 is removed the material 22 can be folded and sent back to a supply depot to be readied for reuse.

Figure 11:
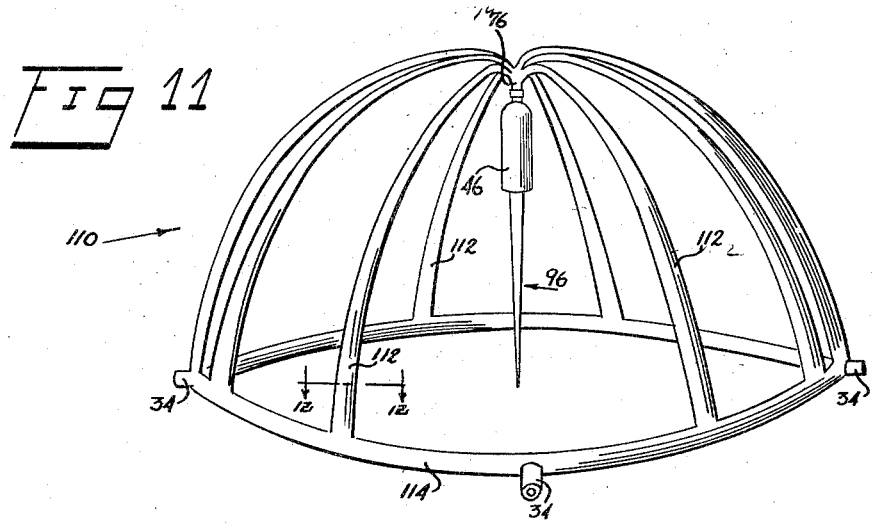
Figure 11 is a perspective view of a novel structural frame employing the novel principles of the present invention.
Figure 12:
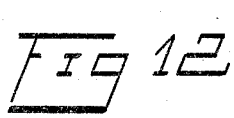
Figure 12 is a sectional view taken on the line 12—12 of Figure 11.
Figure 13:
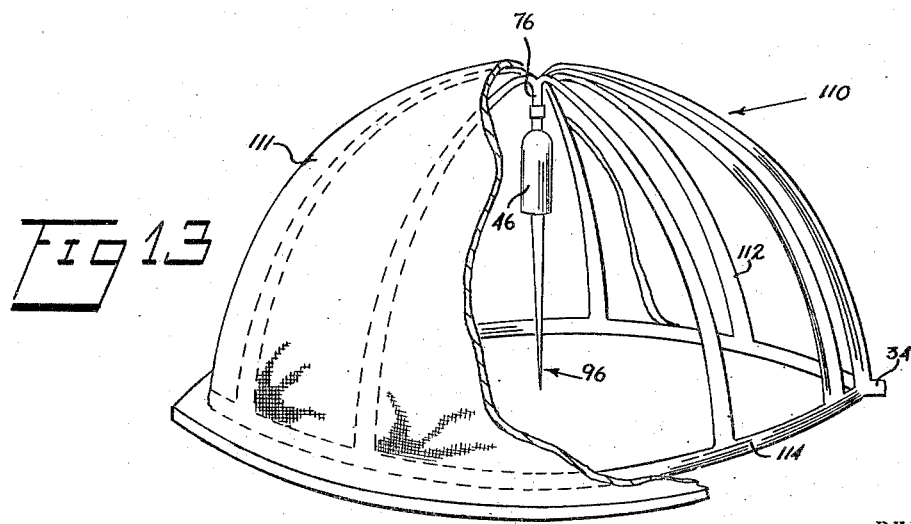
Figure 13 is a perspective view partially broken away showing a covering for the frame of Figure 11.

Turning now to Figures 11 through 13 still a further embodiment of the present novel invention is disclosed which will be presently described. In this form of the invention it is intended to separately form a structural frame, in the aforedescribed manner, over which a separate covering material can be mounted.

Structural frame, generally designated 110, comprises a plurality of hollow ribs 112 commonly connected at their upper ends to a tubular portion 76 and radiating outwardly and downwardly therefrom. The lower ends of ribs 112 are connected to circular lower hollow rib 114 having a plurality of valve housings 34 mounted therein. As clearly seen in Figure 12, ribs 112 and 114 are constructed from a pliable tubular plastic material of any desired type lined with a fabric 58 (not shown) and having loose loops formed by a plurality of fibers 60 and a plurality of granules 64, as described in connection with heretofore described embodiments. The frame 110 is distended in the same manner as aforedescribed as by bottles 46, supported by a stand 96, secured to portion 76 and to valve housings 34. Once frame 110 is formed and sets into a rigid structure a single layer of pliable covering material 111 is laid over the frame 110, as fragmentarily shown in Figure 13 and secured thereto by a plurality of lacings (not shown).

Figure 14:
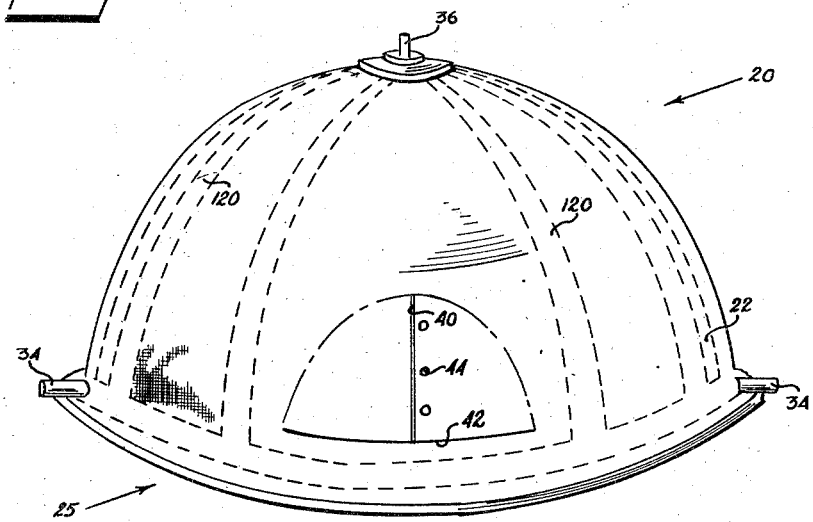
Figure 14 is a front elevational view of another embodiment of the present invention.
Figure 15:
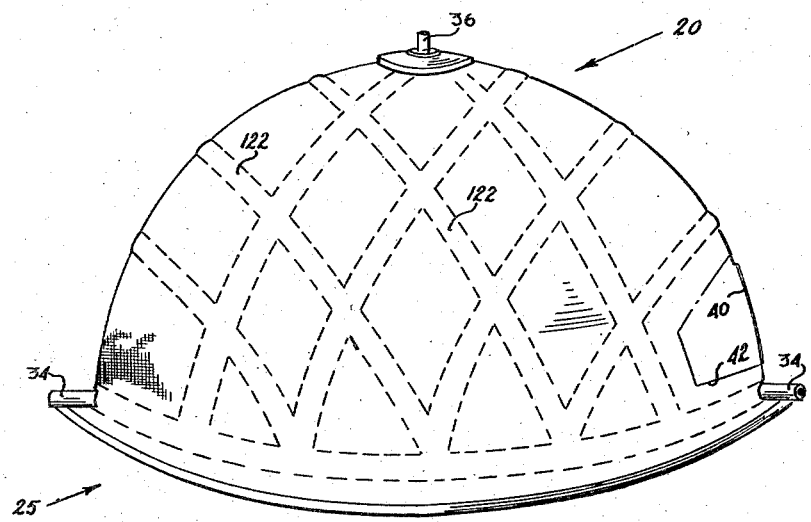
Figure 15 is a front elevational view of still another embodiment of the present novel invention.

Turning now to Figures 14 and 15 there are shown further embodiments of novel shelter 20 having the ribs inherent therein, similar to the embodiment of Figure 1. The radiating ribs 120 of Figure 14 are perfectly suitable to small personal tents requiring a minimum of structural strength, while the criss-crossed ribs 122 of Figure 15 is a pattern more ideally suited to larger wide span tents or shelters which requires a greater amount of strength to support the shelter 20.

Figure 16:
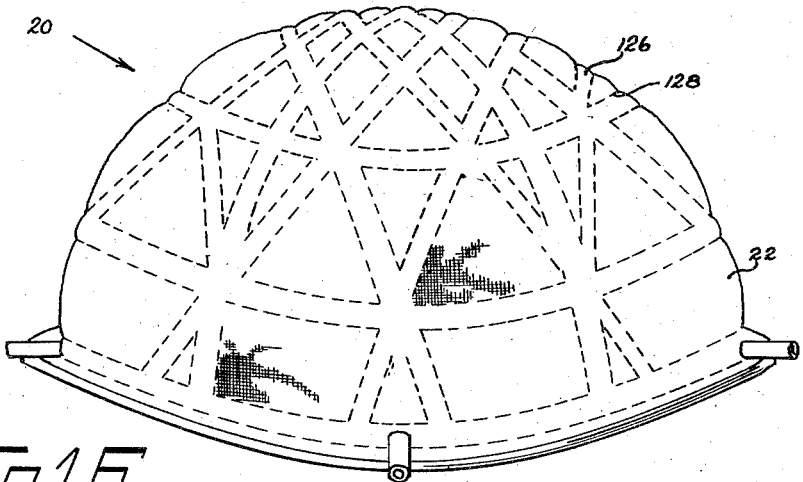
Figure 16 is a front elevational view of yet another embodiment of the present novel invention showing a quilted construction of the tent for Arctic climates.
Figure 17:
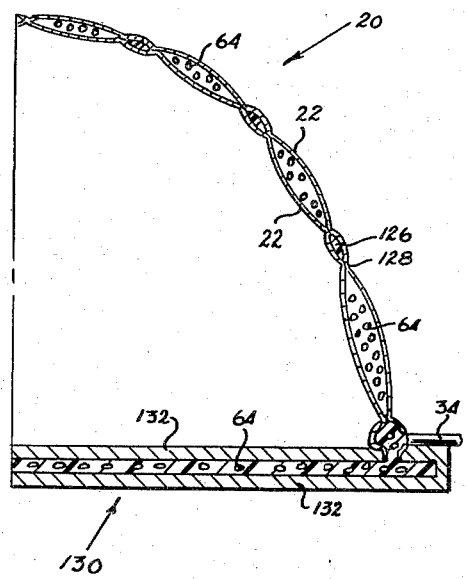
Figure 17 is a partial vertical sectional view of the embodiment shown in Figure 16 showing further details of the quilted constructions; and, Figure 18 is an enlarged vertical sectional view showing a novel valve employed in the present novel invention.

As clearly seen in Figures 16 and 17 there is also disclosed a quilted type of shelter 20 particularly adaptable to Arctic installations. Shelters 20 of Figures 16 and 17 are formed from double layers of material 22 and formed with a plurality of criss-crossed ribs 126 defined by stitchings 128. The spaces between the stitchings 128 are filled with any suitable insulating material, preferably the aforedescribed vermiculite insulation which is extremely light and perfect insulator. As shown in Figure 17 the floor 130 is also formed from double layers 132 with a space therebetween which is also filled with the vermiculite insulating material or any other suitable insulation. Thus the shelter 20 of Figures 16 and 17 is formed essentially in the same manner as heretofore described, but by virtue of the insulated quilted portions and floor it is ideally suited for the extreme cold of the Arctic climates.

It will be readily appreciated from the foregoing description that there is herein provided a novel, inexpensive, easily assembled portable shelter which has its own inherent structural frame formable at the site of use, thereby alleviating logistics problems experienced with conventional forms of tent shelters.

The invention may be embodied in other forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An inflatable shelter comprising, a pliant foldable material defining a shelter when distended; a plurality of hollow interconnecting arteries in said material; a tubular fabric lining in said arteries; a rigid composition in said arteries defining a rigid structural frame for said pliant material; volume increasing means dispersed throughout said composition to assure complete filling of said arteries with said composition; engaging means secured to said tubular fabric and fixedly engaged by said composition for greater structural strength; and valve means connected to some of said arteries for permitting inflation of said shelter and admission of said composition to said arteries.

2. An inflatable shelter comprising, a pair of layers of pliant foldable material defining a shelter when distended; a floor for said shelter of flexible material and integral with said pliant material; a flap door in said pliant material to permit admission and exit from said shelter; a plurality of hollow interconnecting arteries between said layers; a hollow fabric lining mounted in said arteries; a rigid hardened plastic composition in said arteries defining a rigid structural frame for said pliant material; a plurality of light weight cellular insulating bodies dispersed throughout said composition to increase the volume thereof to assure complete filling of said arteries with said composition; a plurality of fiber loops secured to said fabric lining and fixedly engaged by said composition for greater strength; and valve means connected to said arteries for permitting inflation of said pliant material and filling of said arteries with said composition.

3. A distensible tent structure comprising, a pliant foldable material defining said tent when distended; a plurality of interconnected airtight inflatable channel means defining supporting ribs for said material when inflated; an in situ hardenable plastic totally filling said channel means and imparting structural rigidity to said ribs when hardened; and uni-directional valve means connected to said channel means, whereby said hardenable material is admitted to said channel means.

4. The device as set forth in claim 3 wherein said channel means are all interconnected at one of their ends and radiate outwardly and downwardly from said interconnection, and said valve means depends inwardly and downwardly from the point of interconnection of said channel means.

5. The device as set forth in claim 4 wherein support means are connected to said valve means and extend between said valve means and the base of said tent.

6. The device as set forth in claim 5 wherein said support means comprises a pressure bottle securely connected to said valve means, and a telescoping pole connected to the bottom of said pressure bottle and extending downwardly to the base of the tent.

7. An inflatable shelter comprising, a pair of layers of pliant foldable material defining a shelter when distended; a floor for said shelter of flexible material and integral with said pliant material; a plurality of hollow interconnected inflatable arteries between said layers; a hollow fabric lining mounted in unconnected relation within said arteries; an in situ hardenable material in said hollow material in said arteries imparting structural rigidity to said arteries for supporting said shelter; valve means connected to said arteries for admitting said hardenable material to the interior of said arteries; and removable means in said floor at an underside thereof to expose the lower ends of said arteries upon removal of said removable means to permit removal of said hardenable material and hollow lining from said arteries, whereby said shelter can be folded into a compact package.

8. An inflatable tent shelter comprising, a pair of layers of pliant foldable material defining a shelter when distended; a floor of flexible material integral with said pliant foldable material; spaced stitching securing said layers of foldable material together and defining between said stitching a plurality of interconnected inflatable arteries; an in situ hardenable material in said arteries imparting structural rigidity to said arteries and thereby said shelter when hardened; valve means connected to said arteries for admitting said hardenable material to the interior of said arteries; and lightweight cellular bodied insulation material mounted and filling the space between said layers of pliant foldable material between said arteries.

9. The device as set forth in claim 8 wherein said floor is formed of a pair of layers of flexible material; and a lightweight cellular bodied insulation material is mounted and totally fills the space between said layers of the floor for insulating said shelter.

References Cited in the file of this patent

UNITED STATES PATENTS

| 659,981 | McCall | Oct. 16, 1900 |
| 1,964,818 | Hood | July 3, 1934 |
| 2,208,302 | Fernandez | July 16, 1940 |

FOREIGN PATENTS

| 14,957 | Great Britain | June 4, 1894 |
| 130,629 | Australia | Dec. 13, 1948 |